US011335103B2

(12) United States Patent
Suzuki et al.

(10) Patent No.: US 11,335,103 B2
(45) Date of Patent: May 17, 2022

(54) EVALUATION SYSTEM, EVALUATION METHOD, AND STORAGE MEDIUM

(71) Applicant: HONDA MOTOR CO., LTD., Tokyo (JP)

(72) Inventors: Atsuyuki Suzuki, Wako (JP); Masanori Takeda, Wako (JP); Yasuaki Aoki, Tokyo (JP); Hirokazu Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 10 days.

(21) Appl. No.: 16/677,706

(22) Filed: Nov. 8, 2019

(65) Prior Publication Data

US 2020/0160076 A1    May 21, 2020

(30) Foreign Application Priority Data

Nov. 21, 2018 (JP) .............................. JP2018-218359

(51) Int. Cl.
*G06V 20/59* (2022.01)

(52) U.S. Cl.
CPC ........ *G06V 20/597* (2022.01); *G06V 2201/07* (2022.01)

(58) Field of Classification Search
CPC ........... G06K 9/00845; G06K 9/00832; G06K 9/00791; G06K 2209/21; G06Q 10/06393; G06Q 40/025
See application file for complete search history.

(56) References Cited

U.S. PATENT DOCUMENTS

| 10,127,795 | B1 * | 11/2018 | Hwang | H04W 4/023 |
| 2015/0025917 | A1 * | 1/2015 | Stempora | G06K 9/0061 |
| | | | | 705/4 |
| 2017/0200061 | A1 * | 7/2017 | Julian | G06K 9/00791 |
| 2018/0075309 | A1 * | 3/2018 | Sathyanarayana | G05D 1/0055 |

FOREIGN PATENT DOCUMENTS

| CA | 2973917 A1 * | 1/2018 | ........ G06Q 30/0278 |
| CN | 108335489 A * | 7/2018 | |
| JP | 2007269268 A * | 10/2007 | ........... B60H 3/0035 |
| JP | 2009-128486 | 6/2009 | |
| JP | 2012-150557 | 8/2012 | |
| JP | 2014-164629 | 9/2014 | |
| JP | 2015-108854 | 6/2015 | |
| JP | 2018005261 A * | 1/2018 | |

OTHER PUBLICATIONS

Japanese Office Action for Japanese Patent Application No. 2018-218359 dated Dec. 7, 2021.

* cited by examiner

*Primary Examiner* — Matthew C Bella
*Assistant Examiner* — Kathleen M Broughton
(74) *Attorney, Agent, or Firm* — Amin, Turocy & Watson, LLP

(57) ABSTRACT

An evaluation system includes: an acquisition unit that acquires an image acquired by imaging an exterior of a vehicle; and an evaluation unit that derives and assigns an evaluation point for evaluating social credibility of a vehicle occupant of the vehicle on the basis of the image acquired by the acquisition unit.

14 Claims, 16 Drawing Sheets

| No. | VEHICLE ID | VEHICLE OCCUPANT | RUNNING INFORMATION | | RELATING VEHICLE ID1 | RELATING VEHICLE ID2 |
|---|---|---|---|---|---|---|
| 1 | V001 | USER A | 20XX/XX/XX ■■■:■■■ | MERGING | V002 | V003 |
| 2 | | | 20XX/XX/XX ■■■:■■■ | FOLLOWING RUNNING | V002 | |
| 3 | | | 20XX/XX/XX ■■■:■■■ | OTHER VEHICLE MERGING | V004 | |
| ⋮ | | USER B | ⋮ | ⋮ | ⋮ | ⋮ |
| ⋮ | | ⋮ | ⋮ | ⋮ | ⋮ | ⋮ |
| ⋮ | | | ⋮ | ⋮ | ⋮ | ⋮ |

| VEHICLE OCCUPANT | ACCIDENT HISTORY | |
|---|---|---|
| USER A | 20XX/XX/XX | COLLIDE WITH PRECEDING VEHICLE |
| | 20ZZ/ZZ/ZZ | CONTACT WITH GUARD FENCE |
| | ... | ... |

FOR EACH DRIVER

138

| VEHICLE OCCUPANT | EVALUATION EVENT | | EVALUATION POINT |
|---|---|---|---|
| USER A | 20XX/XX/XX | YIELDED | +2 |
| | 20XX/XX/XX | CAUSED ACCIDENT TO OCCUR | -100 |
| | 20XX/XX/XX | RECEIVED MAINTENANCE | +5 |
| | 20XX/XX/XX | RECEIVED LESSON | +50 |
| | ... | ... | ... |

FOR EACH VEHICLE OCCUPANT

| VEHICLE OCCUPANT | EVALUATION POINT |
|---|---|
| USER A | 10 |
| USER B | 5 |
| USER C | 11 |
| ... | ... |

| EVALUATION EVENT | EVALUATION POINT |
|---|---|
| YIELDED | +2 |
| CAUSED ACCIDENT TO OCCUR | −100 |
| RECEIVED MAINTENANCE | +5 |
| RECEIVED REPAIR | +5 |
| RECEIVED LESSON | +50 |
| ... | ... |

| VEHICLE OCCUPANT | ACCIDENT HISTORY | |
|---|---|---|
| USER A | 20XX/XX/XX | COLLIDE WITH PRECEDING VEHICLE |
| | 20ZZ/ZZ/ZZ | CONTACT WITH PROTECTIVE FENCE |
| | ... | ... |

FRO EACH VEHICLE OCCUPANT

| CLASSIFICATION | EVALUATION EVENT | EVALUATION POINT |
|---|---|---|
| COMMON | YIELDED | +2 |
| | CAUSED ACCIDENT TO OCCUR | -100 |
| | RECEIVED MAINTENANCE | +5 |
| | RECEIVED REPAIR | +5 |
| | RECEIVED LESSON | +50 |
| | ... | |
| RIDE SHARING | CLEANED WINDOWS | +2 |
| | PICKED UP GARBAGE | +2 |
| | NO ACCIDENT | +5 |
| | ... | |

| VEHICLE OCCUPANT | EVALUATION EVENT | | EVALUATION POINT |
|---|---|---|---|
| USER A | 20XX/XX/XX | CLEANED WINDOWS | +2 |
| | 20XX/XX/XX | PICKED UP GARBAGE | +2 |
| | 20XX/XX/XX | NO ACCIDENT | +5 |
| | | ... | |

FOR EACH VEHICLE OCCUPANT OR FOR EACH VEHICLE ON WHICH VEHICLE OCCUPANT GETS

EVALUATION SYSTEM, EVALUATION METHOD, AND STORAGE MEDIUM

CROSS-REFERENCE TO RELATED APPLICATION

Priority is claimed on Japanese Patent Application No. 2018-218359, filed Nov. 21, 2018, the content of which is incorporated herein by reference.

BACKGROUND

Field of the Invention

The present invention relates to an evaluation system, an evaluation method, and a storage medium.

Description of Related Art

Conventionally, technologies for acquiring a driving state of a vehicle based on driving/steering of a driver such as a steering angle, an amount of an acceleration operation, and a brake operating state and determining a safe driving level of the driver on the basis of the acquired driving state are known (for example, see Japanese Unexamined Patent Application, First Publication No. 2009-128486).

SUMMARY

However, in a conventional technology, although it can be determined whether or not driving/steering of a driver conforms to traffic rules, it cannot be determined whether the driving/steering conforms to sociability and manners such as consideration of nearby drivers, in other words, a degree of social reliability of a driver cannot be determined.

An aspect of the present invention is in consideration of such situations, and one objective thereof is to provide an evaluation system, an evaluation method, and a storage medium capable of evaluating social credibility of a vehicle occupant.

An evaluation system, an evaluation method, and a storage medium according to the present invention employ the following configurations.

(1): An evaluation system according to one aspect of the present invention is an evaluation system including: an acquisition unit that acquires an image acquired by imaging an exterior of a vehicle; and an evaluation unit that derives and assigns an evaluation score for evaluating social credibility of a vehicle occupant of the vehicle on the basis of the image acquired by the acquisition unit.

(2): In the aspect (1) described above, the acquisition unit additionally acquires information relating to the vehicle occupant of the vehicle and information relating to running of the vehicle, and the evaluation unit derives the evaluation score further on the basis of the information acquired by the acquisition unit.

(3): In the aspect (1) described above, the evaluation unit evaluates the vehicle occupant positively in a case in which a predetermined desirable behavior of the vehicle occupant is detected and evaluates the vehicle occupant negatively in a case in which a predetermined undesirable behavior of the vehicle occupant is detected.

(4): In the aspect (3) described above, the evaluation unit classifies the behavior in patterns on the basis of the image.

(5): In the aspect (2) described above, the information relating to the vehicle occupant is an accident history of the vehicle occupant.

(6): In the aspect (1) described above, the evaluation unit estimates occurrence/non-occurrence of an accident on the basis of the image.

(7): In the aspect (1) described above, the acquisition unit additionally acquires a sensing result relating to running of the vehicle, and the evaluation unit estimates occurrence/non-occurrence of an accident on the basis of the sensing result.

(8): In the aspect (6) described above, in a case in which it is determined that an accident has occurred and it is determined that a cause of the accident is the vehicle occupant, the evaluation unit evaluates the vehicle occupant negatively.

(9): In the aspect (1) described above, the acquisition unit additionally acquires an image acquired by imaging an area outside of the vehicle using an in-vehicle camera mounted in the vehicle and acquires information representing that the vehicle occupant has yielded to another vehicle during driving of the vehicle on the basis of the image acquired by imaging the area outside of the vehicle using the in-vehicle camera, and in a case in which the information representing that the vehicle occupant has yielded is acquired by the acquisition unit, the evaluation unit determines that the vehicle occupant has performed a desirable behavior and evaluates the vehicle occupant positively.

(10): In the aspect (1) described above, the acquisition unit additionally acquires an image acquired by imaging a vehicle cabin, and the evaluation unit evaluates a degree of contribution of the vehicle occupant to keeping the vehicle in order on the basis of the image acquired by imaging the vehicle cabin, determines that the vehicle occupant has performed a desirable behavior and evaluates the vehicle occupant positively in a case in which the degree is equal to or higher than a predetermined upper limit, and determines that the vehicle occupant has performed an undesirable behavior and evaluates the vehicle occupant negatively in a case in which the degree acquired by the acquisition unit is lower than a predetermined lower limit.

(11): In the aspect (10) described above, the acquisition unit acquires a degree of contribution of a vehicle occupant responsible for driving to other vehicle occupants on the basis of the image acquired by imaging the vehicle cabin, and the evaluation unit determines that the vehicle occupant responsible for driving has performed a desirable behavior and evaluates the vehicle occupant responsible for driving positively in a case in which the degree acquired by the acquisition unit is equal to or higher than a predetermined degree.

(12): In the aspect (10) described above, the acquisition unit acquires information used for determining whether or not a vehicle occupant responds to other vehicle occupants with good manners on the basis of the image acquired by imaging the vehicle cabin, and the evaluation unit determines whether or not the vehicle occupant has performed a desirable behavior on the basis of the information, which is acquired by the acquisition unit, used for determining whether or not the vehicle occupant responds with good manners and evaluates the vehicle occupant positively in a case in which it is determined that the vehicle occupant has performed a desirable behavior.

(13): In the aspect (1) described above, a collection unit that collects the evaluation score of the vehicle occupant for each organization unit to which the vehicle occupant belongs is further included.

(14): According to one aspect of the present invention, there is provided an evaluation method using a computer, the evaluation method including: acquiring an image acquired by imaging an exterior of a vehicle; and deriving and assigning an evaluation score for evaluating social credibility of a vehicle occupant of the vehicle on the basis of the acquired image.

(15): According to one aspect of the present invention, there is provided a non-transitory computer-readable storage medium having a program stored thereon, the program causing a computer to execute: acquiring an image acquired by imaging an exterior of a vehicle; and deriving and assigning an evaluation score for evaluating social credibility of a vehicle occupant of the vehicle on the basis of the acquired image.

According to the aspects (1) to (15), social credibility of a vehicle occupant can be evaluated.

BRIEF DESCRIPTION OF THE DRAWINGS

FIG. 3 is a diagram showing one example of details of vehicle running information;

FIG. 5 is a diagram showing one example of details of accident history information;

FIG. 10 is a diagram showing one example of details of an evaluation score;

FIG. 11 is a diagram showing one example of details of an evaluation table;

FIG. 12 is a diagram showing one example of details of accident history information;

FIG. 18 is a diagram showing one example of details of an evaluation table;

FIG. 19 is a diagram showing evaluation event information at the time of ride sharing;

DESCRIPTION OF EMBODIMENTS

Hereinafter, an evaluation system, an evaluation method, and a storage medium according to embodiments of the present invention will be described with reference to the drawings.

First Embodiment

Figure 1:
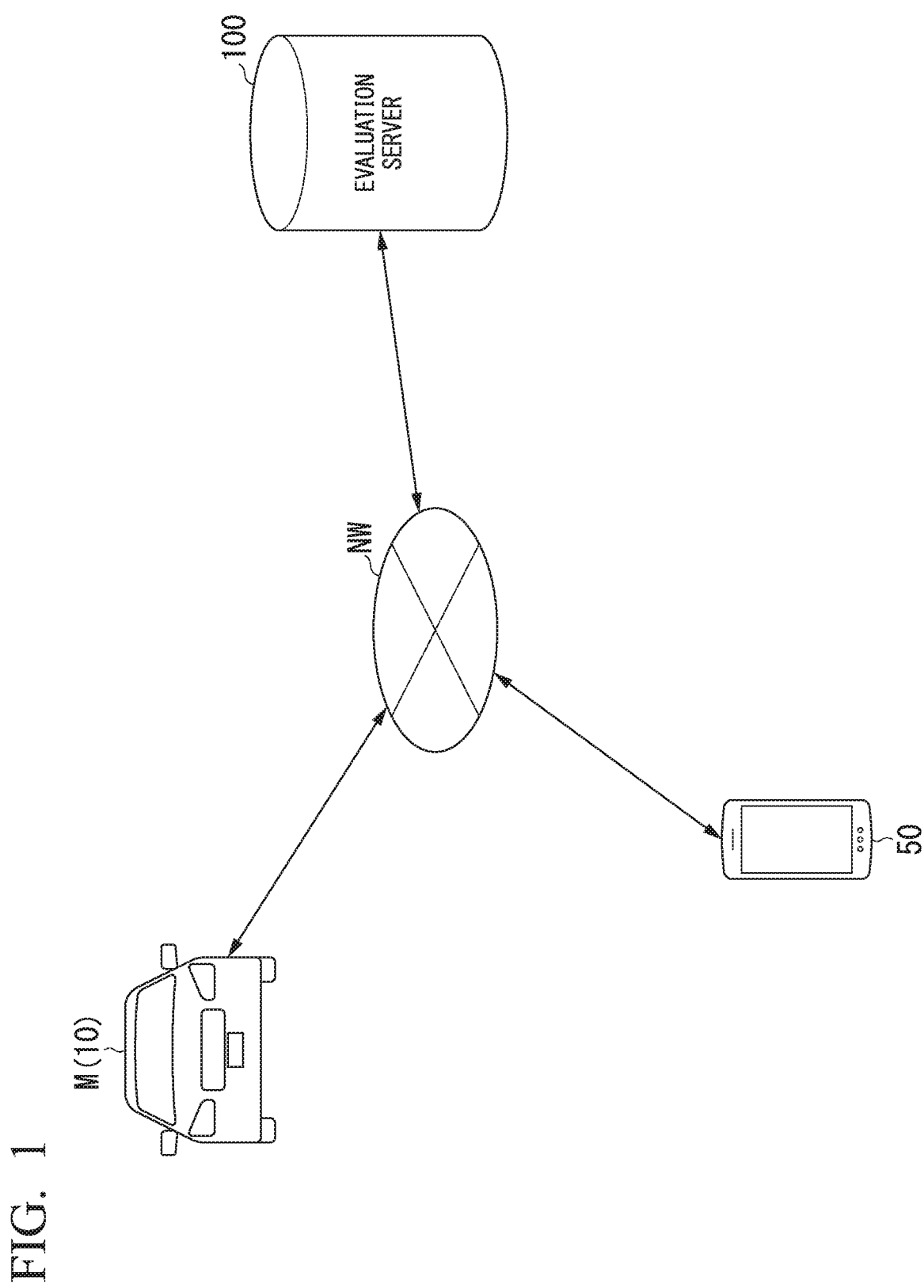
FIG. 1 is a configuration diagram of an evaluation system according to a first embodiment.

FIG. 1 is a diagram showing the configuration of an evaluation system 1. The evaluation system 1, for example, includes a vehicle M in which an in-vehicle device 10 is mounted, a terminal device 50 used by a vehicle occupant of the vehicle M, and an evaluation server 100.

The in-vehicle device 10, the terminal device 50, and the evaluation server 100 communicate with each other through a network NW. Examples of the network NW include a local area network (LAN), a wide area network (WAN), the Internet, a cellular network, a Wi-Fi network, Bluetooth (registered trademark), a dedicated short range communication (DSRC), and the like.

The vehicle M, for example, is a vehicle having two wheels, three wheels, four wheels, or the like, and a driving source thereof is an internal combustion engine such as a diesel engine or a gasoline engine, an electric motor, or a combination thereof.

The in-vehicle device 10 transmits information relating to behaviors raising an evaluation value (hereinafter, referred to as an evaluation score) representing social credibility of a vehicle occupant, which are performed by the vehicle occupant of the vehicle M, and behaviors lowering the evaluation score to the evaluation server 100.

The terminal device 50 transmits an image acquired by imaging an exterior of the vehicle M relating to behaviors raising the evaluation score and behaviors lowering the evaluation score in the in-vehicle device 10 to the in-vehicle device 10.

The evaluation server 100 manages the evaluation score of a vehicle occupant on the basis of information received from the in-vehicle device 10. The evaluation server 100, for example, is managed by a public institution, a manufacturing company of a vehicle M, an insurance company, a credit company, or the like.

[In-Vehicle Device]

Figure 2:
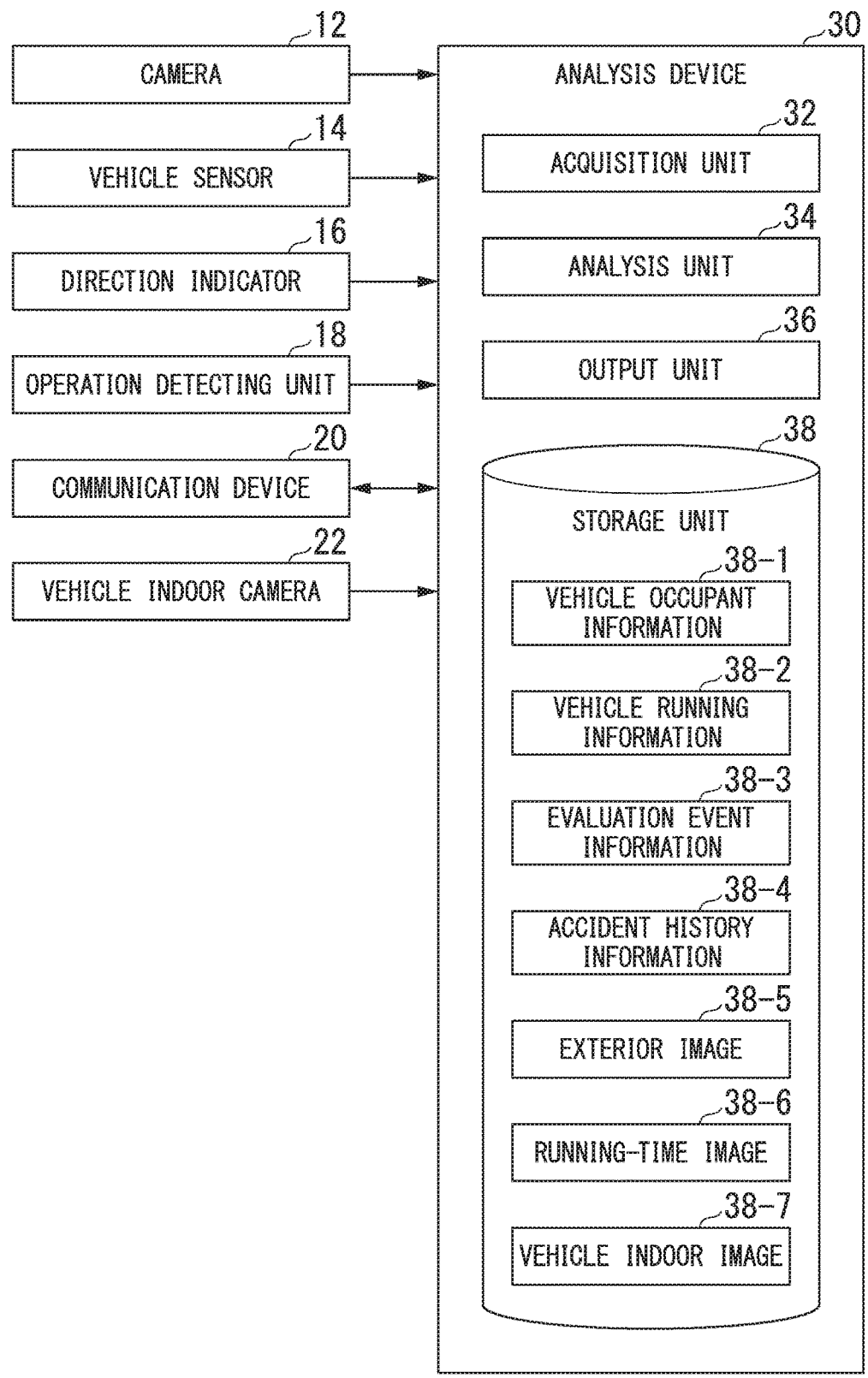
FIG. 2 is a diagram showing the configuration of an in-vehicle device.

FIG. 2 is a diagram showing the configuration of the in-vehicle device 10. The in-vehicle device 10, for example, includes a camera 12, a vehicle sensor 14, a direction indicator 16, an operation detecting unit 18, a communication device 20, a vehicle indoor camera 22, and an analysis device 30. Such devices, functions, and the like are interconnected through a multiple communication line such as a controller area network (CAN) communication line, a serial communication line, a radio communication network, or the like. The in-vehicle device 10 may include an electronic control unit (ECU) controlling each unit of the vehicle and the like in addition to the functional components described above. The components shown in FIG. 2 are merely one example, and some of the components may be omitted, or other components may be added.

The camera 12, for example, is a digital camera using a solid-state imaging device such as a charge coupled device (CCD) or a complementary metal oxide semiconductor (CMOS). One or a plurality of cameras 12 are mounted at arbitrary places of the vehicle M in which the in-vehicle device 10 is mounted and image areas outside of the vehicle M. In a case in which an area to the front is to be imaged, the camera 12 is mounted in an upper part of a front wind shield, a rear face of a rearview mirror, or the like. The camera 12, for example, periodically images the vicinity of the vehicle M repeatedly. The camera 12 is a stereo camera.

In the vehicle M, a camera that images an area to the rear or in a horizontal direction may be mounted in addition to a camera imaging the area to the front. In a case in which the area to the rear is to be imaged, the camera 12 is mounted near a rear bumper of the vehicle M. In a case in which an area to the side or to the rear of the vehicle is to be imaged, for example, the camera is mounted in an exterior part of a vehicle body (for example, an A pillar, a roof, or a side door) or the like. Accordingly, the cameras 12 can image other vehicles running in front of, behind, and to the left and right of the vehicle M and other vehicles passing the vehicle M.

The vehicle sensor 14 includes a vehicle speed sensor detecting a speed of the vehicle M, an acceleration sensor detecting an acceleration, a yaw rate sensor detecting an angular velocity around a vertical axis, an azimuth sensor detecting a direction of the vehicle M, and the like.

The direction indicator 16 starts flashing in a case that a driver operates a predetermined operation unit and stops flashing when the driver performs an operation of returning the predetermined operation unit to a state before the operation. The operation detecting unit 18 detects an operation performed on the direction indicator. For example, the operation detecting unit 18 detects whether the direction indicator is flashing (on) or not flashing (off) and outputs a result of the detection to the analysis device 30.

The communication device 20, for example, communicates with the terminal device 50 using Bluetooth or the like. The communication device 20, for example, may communicate with other vehicles present in the vicinity of the vehicle M using a cellular network, a Wi-Fi network, Bluetooth, dedicated short range communication (DSRC), or the like or may communicate with various server apparatuses through a radio base station.

The vehicle indoor camera 22, for example, is a digital camera using a solid-state imaging device such as a CCD or a CMOS. One or a plurality of vehicle indoor cameras 22 are mounted at arbitrary places (desirably, places at which all the vehicle occupants including a driver can be imaged) of the vehicle M in which the in-vehicle device 10 is mounted and image the vehicle cabin of the vehicle M. The vehicle indoor camera 22, for example, periodically images the vehicle cabin of the vehicle M repeatedly. The vehicle indoor camera 22 may be a stereo camera.

The analysis device 30, for example, includes an acquisition unit 32, an analysis unit 34, an output unit 36, and a storage unit 38. Such constituent elements except for the storage unit 38, for example, are realized by a computer processor such as a central processing unit (CPU) executing a program (software). Some or all of such constituent elements may be realized by hardware (a circuit unit; including circuitry) such as a large scale integration (LSI), an application specific integrated circuit (ASIC), a field-programmable gate array (FPGA), a graphics processing unit (GPU), or the like or may be realized by software and hardware in cooperation. The program may be stored in the storage unit 38 in advance or may be stored in a storage medium such as a DVD or a CD-ROM that can be loaded or unloaded and installed in the storage unit 38 by loading the storage medium in a drive device.

The acquisition unit 32 acquires an image captured by the camera 12, a result of detection acquired by the vehicle sensor 14, a result of detection acquired by the direction indicator 16, a result of detection acquired by the operation detecting unit 18, an image captured by the vehicle indoor camera 22, and the like.

The acquisition unit 32 stores images, from which at least a part of an exterior of the vehicle body of the vehicle M can be seen, among images captured by the camera 12 in the storage unit 38 as exterior images 38-5 and stores images acquired at the time of running of the vehicle M in the storage unit 38 as running-time images 38-6. The acquisition unit 32 stores images captured by the vehicle indoor camera 22 in the storage unit 38 as vehicle indoor images 38-7.

The acquisition unit 32 stores a result of detection acquired by the direction indicator 16 and a result of detection acquired by the operation detecting unit 18 in the storage unit 38 as vehicle running information 38-2.

The analysis unit 34 analyzes images and information acquired by the acquisition unit 32. The analysis unit 34 stores an analysis result relating to the vehicle occupant's driving among analysis results in the storage unit 38 as vehicle running information 38-2.

More specifically, the vehicle running information 38-2, for example, is information relating to a running mode such as constant-speed following running, a lane change, branching, merging, overtaking, or passing of the vehicle M (for example, information relating to a driver of the vehicle M, a running mode of the vehicle M, a time at which the running mode is executed, information used for identifying other vehicles relating to the running mode, and the like).

FIG. 3 is a diagram showing one example of details of the vehicle running information 38-2. In the following description, it will be assumed that a vehicle ID used for identifying the vehicle M is V001. In the vehicle running information 38-2, log information representing how a driver has driven the vehicle M is accumulated. In the vehicle running information 38-2, for example, information representing merging between another vehicle of which a vehicle ID is V002 and another vehicle of which a vehicle ID is V003 (No. 1 shown in FIG. 3) and thereafter running behind the other vehicle of which the vehicle ID is V002 (No. 2 shown in FIG. 3) is stored, or information representing securement of a space by lowering the vehicle speed such that another vehicle of which the vehicle ID is V004 (No. 3 shown in FIG. 3) can merge is stored.

The analysis unit 34, for example, determines whether coincidence with a result of recognition of a road and the like recognized from an image captured by the camera 12 is performed while visually comparing map information that a navigation device or the like of the vehicle M has with position information of the vehicle M and determines whether or not the vehicle V has performed such a typical behavior. For example, regarding following, the analysis unit 34 determines that following running has been performed in a case in which the vehicle runs behind the same vehicle while maintaining a constant interval or the like by referring to a series of images captured by the camera 12. The analysis unit 34 determines that the vehicle that has been followed is the same, for example, by using a number plate or receiving a vehicle ID.

For example, in a case in which the vehicle M has passed through a merging path on the basis of map information that a navigation device or the like of the vehicle M has, there is another vehicle within a predetermined range in the merging lane, and a space is secured such that the vehicle M can merge therein by the other vehicle lowering its vehicle speed, the analysis unit 34 determines that merging of the vehicle M has been performed. In a case in which it has been recognized that a behavior of another vehicle indicating dissatisfaction such as turning on a headlight for a short time or sounding a horn is performed on the basis of a series of images captured by the camera 12, the analysis unit 34 analyzes that the vehicle M has cut in and merged. The determination of whether or not an event such as following, merging, or the like has been performed using the analysis unit 34 may be performed by accepting a result of analysis performed by another vehicle and may be performed on the basis of the result of analysis.

The analysis unit 34 stores information relating to an evaluation event among analysis results relating to driving of a vehicle occupant in the storage unit 38 as evaluation event information 38-3. An evaluation event is a behavior of a vehicle occupant driving the vehicle M (hereinafter referred to as a driver) who is a target for assignment of an evaluation score in the evaluation server 100 to be described later.

The output unit 36 transmits some or all of various kinds of information stored in the storage unit 38 to the evaluation server 100 at a predetermined timing (for example, a timing at which a vehicle occupant exits the vehicle M, a shift timing of a driver, or the like) through the communication device 20.

The storage unit 38, for example, may be realized by a storage device (a storage device including a non-transitory storage medium) such as a flash memory or may be realized by loading a storage medium (a non-transitory storage medium) that can be loaded or unloaded such as an HDD, a DVD or a CD-ROM in a drive device. The storage unit 38, for example, stores vehicle occupant information 38-1, vehicle running information 38-2, evaluation event information 38-3, accident history information 38-4, an exterior image 38-5, a running-time image 38-6, a vehicle indoor image 38-7, and the like.

Figure 4:
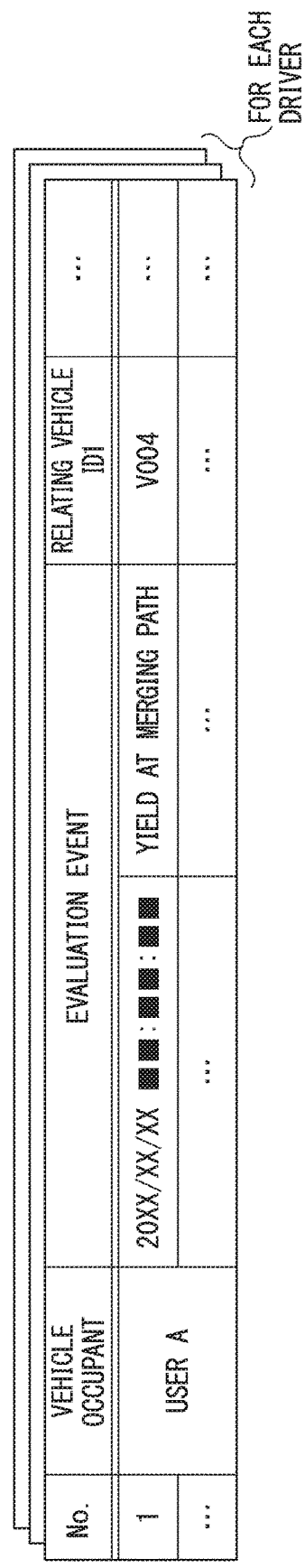
FIG. 4 is a diagram showing one example of details of evaluation event information.

FIG. 4 is a diagram showing one example of details of the evaluation event information 38-3. In the evaluation event information 38-3, for example, information indicating that a driver has yielded to another vehicle in a merging path (No. 1 shown in FIG. 4) and the like are stored for each driver.

FIG. 5 is a diagram showing one example of details of the accident history information 38-4. In the accident history information 38-4, information relating to accidents caused by a driver of the vehicle M in the past is stored for each driver. The information stored in the accident history information 38-4 may be acquired by extracting evaluation event information 38-3 indicating detection of accidents caused by vehicle occupants using the analysis unit 34 of the in-vehicle device 10 or, for example, may be acquired by reflecting information of accidents provided by an external device managed or used by the police, an insurance company, a vehicle repair factory, or the like.

A vehicle indoor image 38-7 is an image that is captured by the vehicle indoor camera 22 before/after a vehicle occupant enters the vehicle M or while a vehicle occupant enters. The analysis unit 34 performs an analysis of driving of a vehicle occupant on the basis of the above-described information and images stored in the storage unit 38.

In the vehicle occupant information 38-1, information such as identification information (ID), a name, an address, and the like used for recognizing a user who is a vehicle occupant is included.

Some or all of the functions of the analysis device 30, as shown in FIG. 2, may be included in the in-vehicle device 10 or may be realized by an external device (for example, the evaluation server 100) of the in-vehicle device 10.

[Terminal Device]

Figure 6:
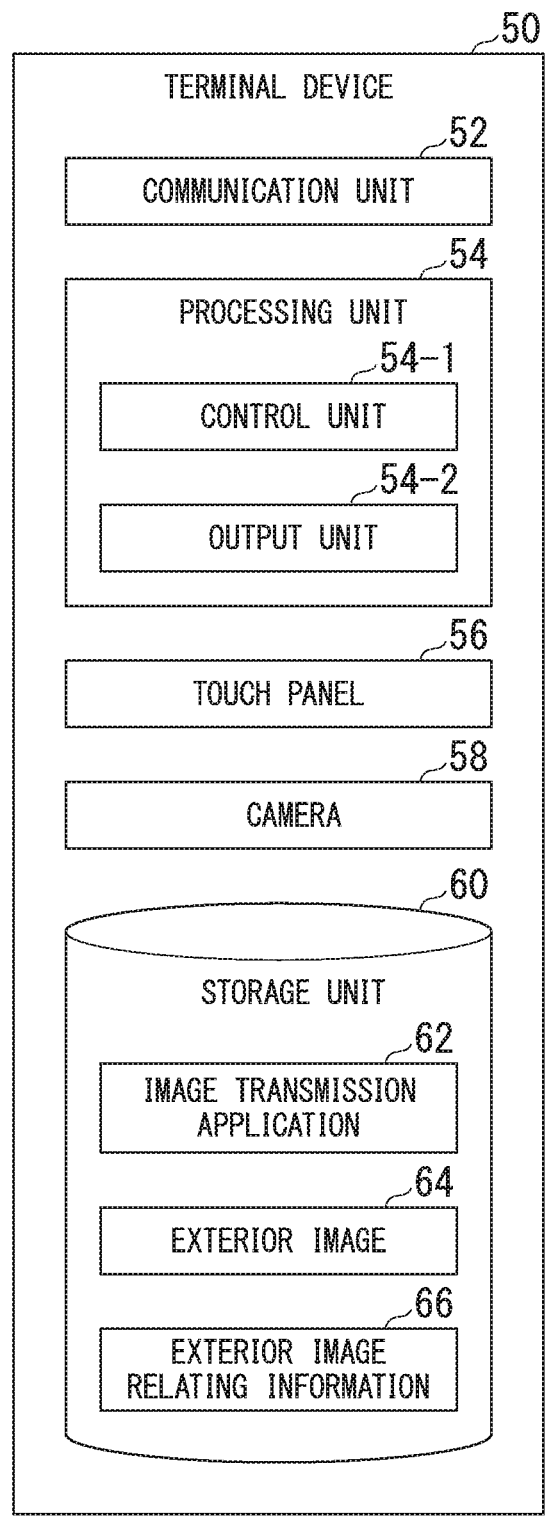
FIG. 6 is a diagram showing the configuration of a terminal device.

FIG. 6 is a diagram showing the configuration of the terminal device 50. The terminal device 50, for example, is a terminal device that can be held by a vehicle occupant such as a smartphone or a tablet terminal. The terminal device 50, for example, includes a communication unit 52, a processing unit 54, a touch panel 56, a camera 58, and a storage unit 60. The constituent elements except for the storage unit 60, for example, are realized by a computer processor such as a CPU executing a program (software). Some or all of such constituent elements may be realized by hardware (a circuit unit; including circuitry) such as an LSI, a GPU, or the like or may be realized by software and hardware in cooperation. The program may be stored in the storage unit 60 in advance or may be stored in a storage medium such as an SD card that can be loaded or unloaded and installed in the storage unit 60 by loading the storage medium in a drive device.

The communication unit 52, for example, communicates with the in-vehicle device 10 using a cellular network, a Wi-Fi network, Bluetooth, or the like.

The processing unit 54 is realized by executing an image transmission application 62 to be described later using a processor such as a CPU of the terminal device 50 or the like.

The processing unit 54, for example, includes a control unit 54-1 and an output unit 54-2. The control unit 54-1 stores images showing the exterior of the vehicle M acquired by the camera 58 in the storage unit 60 as exterior images 64.

The output unit 54-2 outputs images that have been acquired by the camera 58 and stored in the storage unit 60 to the communication unit 52, thereby causing the communication unit 52 to transmit the images to the in-vehicle device 10.

The touch panel 56 accepts the vehicle occupant's operation inputs for the image transmission application 62 and the like and outputs results of acceptance of the operation inputs to the control unit 54-1.

The storage unit 60, for example, is realized by a read only memory (ROM), a flash memory, an SD card, a random access memory (RAM), a register, or the like. In the storage unit 60, for example, the image transmission application 62, exterior images 64, exterior-image-related information 66, and the like are stored.

The image transmission application 62, for example, is an application program that is provided by a server under the management of a vehicle manufacturer and is downloaded to the terminal device 50. The image transmission application 62, for example, is used when a vehicle occupant of the vehicle M reports his or her driving. The image transmission application 62 stores details of the vehicle occupant's report relating to the exterior images 64 in the storage unit 60 as exterior-image-related information 66.

The image transmission application 62 transmits exterior images 64 captured by a vehicle occupant and exterior-image-related information 66 associated with the exterior images 64 to the in-vehicle device 10. The exterior-image-related information 66, for example, is a vehicle occupant's comments on exterior images 64.

The in-vehicle device 10 receives an exterior image 64 transmitted by the image transmission application 62 through the communication device 20 and outputs the received exterior image to the analysis device 30. The exterior image 64 transmitted by the image transmission application 62 is analyzed by the analysis unit 34 and then stored as an exterior 38-5.

Figure 7:
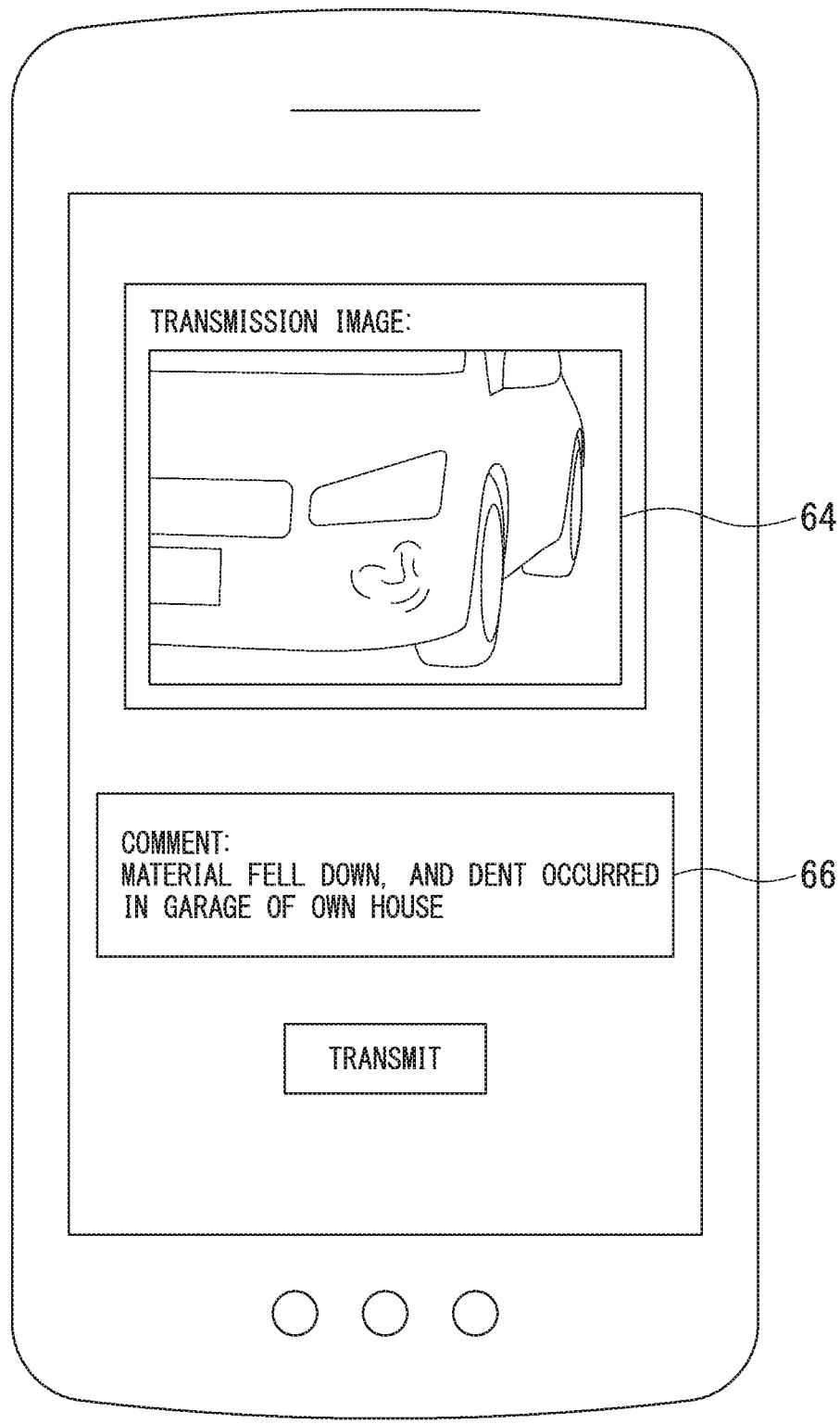
FIG. 7 is a diagram schematically showing an example of an input screen of an image transmission application.

FIG. 7 is a diagram schematically showing an example of an input screen of the image transmission application 62. The image transmission application 62, for example, reports that a cause of damage or a dent is not an accident, as shown in FIG. 7, by transmitting an exterior image 64 and exterior-image-related information 66 that is a comment on the exterior image 64 to the in-vehicle device 10 for the damage or the dent formed due to a specific reason while a vehicle M is parked by a driver in a garage of his or her home.

[Evaluation Server]

Figures 8, 9:
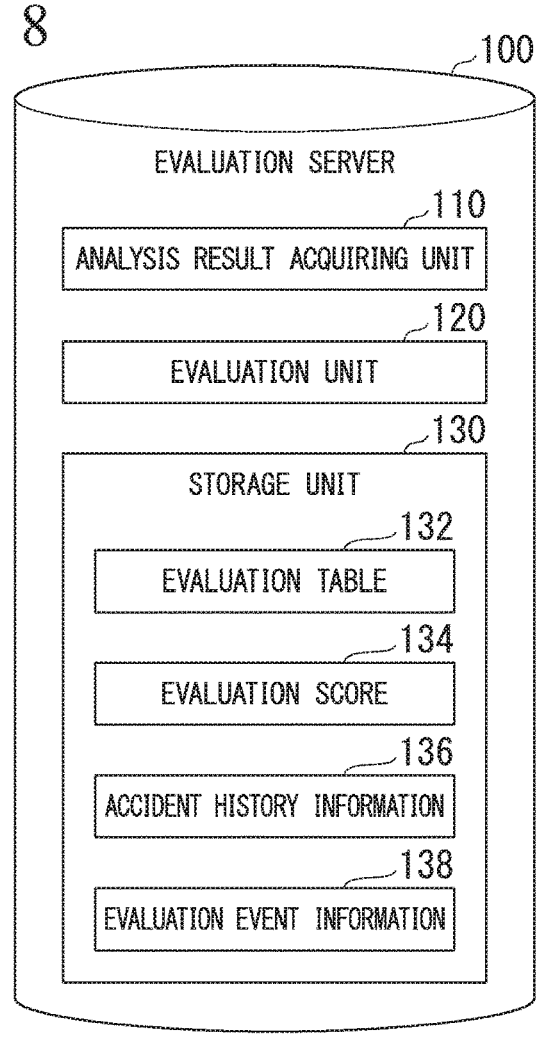
FIG. 8 is a diagram showing the configuration of an evaluation server.
FIG. 9 is a diagram showing one example of details of evaluation event information.

FIG. 8 is a diagram showing the configuration of the evaluation server 100. The evaluation server 100, for example, includes an analysis result acquiring unit 110, an evaluation unit 120, and a storage unit 130. The analysis result acquiring unit 110 and the evaluation unit 120, for example, are realized by a computer processor such as a CPU executing a program (software). Some or all of such constituent elements may be realized by hardware (a circuit unit; including circuitry) such as an LSI, an ASIC, an FPGA, a GPU, or the like or may be realized by software and hardware in cooperation. The program may be realized by a storage device (a storage device including a non-transitory storage medium) such as an HDD or a flash memory in advance or may be realized by loading a storage medium (a non-transitory storage medium) that can be loaded or unloaded such as a DVD or a CD-ROM in a drive device.

The analysis result acquiring unit 110 acquires evaluation event information 38-3 that is a result of an analysis of a vehicle occupant's behavior analyzed by the analysis device 30 of the in-vehicle device 10. The analysis result acquiring unit 110 stores the acquired evaluation event information 38-3 in the storage unit 130 as the evaluation event information 138.

FIG. 9 is a diagram showing one example of details of the evaluation event information 138. In the evaluation event information 138, for example, some of the evaluation event information 38-3 transmitted by the in-vehicle device 10 relating to an evaluation is stored in a state in which it is selected from the evaluation event information for each vehicle occupant. In the evaluation event information 138, a status of assignment of an evaluation score that is a result evaluated by the evaluation unit 120 to be described later may be stored together. The example shown in FIG. 9 represents that the evaluation unit 120 assigns an evaluation score of +2 points to an evaluation event of a user A who is a vehicle occupant yielding to another vehicle and assigns an evaluation score of −100 points to an evaluation event of causing an accident.

In the evaluation event information 138, an exterior image 38-5 analyzed by the analysis device 30 and an exterior image 64 and exterior-image-related information 66 transmitted by a vehicle occupant using the image transmission application 62 may be included. In the exterior image 38-5, for example, an image relating to an evaluation event associated with an undesirable behavior is included.

The analysis result acquiring unit 110 acquires accident history information 38-4 analyzed by the analysis device 30 and stores the acquired accident history information in the storage unit 130 as accident history information 136.

FIG. 10 is a diagram showing one example of details of the evaluation score 134. In the evaluation score 134, for example, information representing a vehicle occupant and an evaluation score of the vehicle occupant is stored. The evaluation score 134 corresponds to a total value of evaluation scores of the evaluation event information 138 shown in FIG. 9 for each vehicle occupant within a predetermined period (for example, the past month, the past year, or the like). In the evaluation score 134, for example, as shown in FIG. 12, information representing that the evaluation score of a user A who is a vehicle occupant is 10 and the evaluation score of a user B who is a vehicle occupant is 5 is stored. The evaluation unit 120, by outputting the evaluation score 134 of a vehicle occupant for a predetermined period, provides information serving as an index of an evaluation of social credibility of the vehicle occupant for a user of the evaluation server 100. In the example shown in FIG. 10, since the user A has a higher evaluation score than that of the user B, a state in which the user A is evaluated to have higher credibility than the user B can be determined. In the example shown in FIG. 10, since a user C has a higher evaluation score than the user A and the user B, a state in which the user C is evaluated to have credibility higher than the user A and the user B can be determined.

Referring back to FIG. 8, on the basis of the evaluation event information 138, the evaluation unit 120 evaluates a vehicle occupant positively in a case in which it is detected that the vehicle occupant has performed a predetermined desirable behavior and evaluates a vehicle occupant negatively in a case in which it is detected that the vehicle occupant has performed a predetermined undesirable behavior. A predetermined desirable behavior and a predetermined undesirable behavior will be described later.

The evaluation unit 120 determines an evaluation score assigned to a vehicle occupant on the basis of the evaluation event information 138 acquired by the analysis result acquiring unit 110 and an evaluation table 132 and stores the determined evaluation score as the evaluation score 134. The evaluation unit 120 stores an analysis result relating to an evaluation of a vehicle occupant acquired by the analysis result acquiring unit 110 and a result of assignment of an evaluation score assigned to the vehicle occupant as evaluation event information 138.

FIG. 11 is a diagram showing one example of details of the evaluation table 132. The evaluation unit 120, for example, assigns an evaluation score for each behavior of a vehicle occupant by referring to the evaluation table 132 as shown in FIG. 11. For example, in a case in which an evaluation event of a vehicle occupant yielding is detected, the evaluation unit 120 searches the evaluation table 132 shown in FIG. 11 and adds two points as an evaluation point number associated with the evaluation event of yielding. Similarly, in a case in which an evaluation event of causing an accident is detected, the evaluation unit 120 searches the evaluation table 132 and subtracts 100 points as an evaluation point number associated with the evaluation event of causing an accident.

In the evaluation table 132, an evaluation rule may be stored. The evaluation rule, for example, is a rule that an evaluation score assigned for yielding is doubled in a case in which yielding is performed two times or more in one day, an evaluation score assigned for yielding is tripled in a case in which yielding is performed five times or more in one week, and the like. The evaluation unit 120 derives an evaluation score to be assigned on the basis of the evaluation rule stored in the evaluation table 132.

FIG. 12 is a diagram showing one example of details of the accident history information 136. For example, information provided by an external device used by the police, an insurance company, or the like (for example, in the case of an accident relating to a plurality of vehicles, a fault ratio of the subject vehicle side or the like) may be reflected in the accident history information 136.

In the storage unit 130, for example, information such as the evaluation table 132, the evaluation score 134, the accident history information 136, the evaluation event information 138, and the like is stored.

[Classification of Evaluation Event]

The evaluation unit 120 classifies an evaluation event as a predetermined desirable behavior or a predetermined undesirable behavior. A predetermined desirable behavior, for example, is a determination criterion for a vehicle occupant having sociability or a determination criterion for a vehicle occupant having a tendency of good manners such as no accident for a predetermined period, safe driving, environmentally friendly driving, yielding to other vehicles, or the like.

A predetermined undesirable behavior, for example, is causing a traffic accident, violating a traffic rule, tailgating (aggressive driving behavior), littering, or the like.

[Analysis of Desirable Behavior]

The analysis unit 34 analyzes an evaluation event of a vehicle occupant of the vehicle M and detects that a desirable behavior has been performed by the vehicle occupant. For example, in a case in which a target to be detected as a desirable behavior is a behavior of yielding, the analysis unit 34 analyzes an image of the area outside of the vehicle captured by the camera 12 and detects a behavior that can be analyzed as a vehicle occupant of the vehicle M yielding while driving. Yielding, for example, means lowering one's vehicle speed at a merging point of a vehicle advancing in the same direction and allowing another vehicle to pass first, pulling over one's vehicle at the end of a narrow road on which it is difficult to perform two-way running and allowing an opposing vehicle to pass first, or pulling over or stopping one's vehicle at the end of a road to allow an emergency vehicle or the like to pass first. In a case in which there is originally sufficient space for another vehicle to merge and thus the speed of the vehicle M is not deliberately lowered or a case in which another vehicle has forcibly merged, the analysis unit 34 does not analyze that the vehicle has yielded.

Whether or not a desirable behavior has been performed may be analyzed by referring to a reaction of a person benefiting from the behavior. For example, in a case in which it is detected that a vehicle occupant of an opposing vehicle has raised his or her hand or a case in which a behavior representing an expression of gratitude such as flashing or the like of a hazard lamp or the like is detected, the analysis unit 34 analyzes that a vehicle occupant of the vehicle M has yielded. As a result of communication of the communication device 20 with another vehicle present in the vicinity of the vehicle M, in a case in which information or the like representing an expression of gratitude for a desirable behavior has been received, the analysis unit 34 may detect that a vehicle occupant of the vehicle M has yielded.

[Analysis of Undesirable Behavior]

The analysis unit 34 detects that an undesirable behavior has been performed by a vehicle occupant by analyzing an evaluation event of a vehicle occupant of the vehicle M.

For example, in a case in which an evaluation event that is a target to be detected as an undesirable behavior is causing a traffic accident, the analysis unit 34 estimates whether or not a vehicle occupant of the vehicle M has caused a traffic accident by analyzing a state of the vehicle M acquired by analyzing an image transmitted by the terminal device 50 or analyzing a sensing result representing running information of the vehicle detected by various ECUs (not shown in the drawing).

The analysis unit 34 detects a change in the exterior of the vehicle M by comparing an exterior image 38-5 of the vehicle M captured before the occupant enters the vehicle, the previous time the occupant exited the vehicle, or the like with an exterior image 64 transmitted by the terminal device 50. A change in the exterior, for example, is an increase in damage or dents of the vehicle body of the vehicle M. In a case in which a change in the exterior of the vehicle M is detected, the analysis unit 34 analyzes that a certain accident has been caused while the vehicle occupant was in the vehicle.

In a case in which a cause of the occurrence of the damage or the dent of the vehicle body of the vehicle M is not a behavior of the vehicle occupant, and there is a reasonable cause (for example, in the case of being involved in an accident of another person, a case in which a dent occurs due to a falling object or a flying object, a case in which damage occurs due to a certain problem at a timing at which the vehicle is not running such as at the when entering or exiting, a case in which damage or a dent occurs due to malicious behavior of another person, or the like), the analysis unit 34 may accept a report thereof from the vehicle occupant.

In such a case, the analysis unit 34 determines whether or not the vehicle occupant has caused an accident with the exterior image 64, in which the damage or the dent is reflected, transmitted by the image transmission application 62 of the terminal device 50 as shown in FIG. 7 and the exterior-image-related information 66, which is a comment of the vehicle occupant on a cause of the damage or the dent reported by the vehicle occupant, also taken into account. The analysis unit 34 may search for an exterior image 38-5 and a running-time image 38-6 of a time frame at which the damage or the dent is assumed to have occurred and check that there is no contradiction between a result of the search and the vehicle occupant's report details of the image transmission application 62.

The analysis unit 34 may estimate a cause of the occurrence of damage or a dent by analyzing an image at the time of occurrence of the damage or the dent that has been captured by the camera 12. The analysis unit 34 distinguishes between damage or a dent that has occurred in accordance with a behavior of a driver and damage or a dent not caused by a behavior of a vehicle occupant and stores a result thereof in the evaluation event information 38-3. In the case of damage or a dent not caused by a vehicle occupant's behavior, the analysis unit 34 may omit storage of the information in the evaluation event information 38-3 and store the information in the vehicle running information 38-2 or may omit storage of the information.

The analysis unit 34 estimates whether a vehicle occupant of the vehicle M has caused a traffic accident by analyzing a sensing result representing running information of the vehicle detected by the ECU. For example, in a case in which a control ECU that determines whether or not the vehicle collides with a target object such as another vehicle in front of it and a brake control ECU that alleviates shock in a case in which a collision occurs are mounted in the vehicle M, the analysis unit 34 estimates that a vehicle occupant of the vehicle M has caused a traffic accident in a case in which the control ECU determines that the vehicle collides with a target object, and the brake control ECU operates and alleviates the shock.

In a case in which an accident causing an air bag installed in the vehicle M to operate has occurred, the analysis unit 34 analyzes that there has been an accident on the basis of a sensing result of a control ECU controlling the airbag. Furthermore, the analysis unit 34 may estimate whether a vehicle occupant of the vehicle M has caused an accident or has been involved in an accident caused by another person by analyzing images captured by the camera 12 before and after a timing at which the accident has occurred by referring to the sensing result of the control ECU.

For example, in a case in which an evaluation event that is a target to be detected as an undesirable behavior is tailgating (aggressive driving behavior), the analysis unit 34 determines whether or not a vehicle occupant of the vehicle M has performed tailgating (aggressive driving behavior) by analyzing images captured by the camera 12. It is analyzed that tailgating (aggressive driving behavior) has been performed in a case in which the vehicle continues to run closer to a preceding vehicle than necessary as determined on the basis of a distance from the vehicle M to the preceding vehicle acquired by the acquisition unit 32, or a behavior of blinking headlights, frequently sounding a horn, running the vehicle M by turning the handle to the left and right sides at short intervals, or the like is detected.

The analysis unit 34, as described above, analyzes a behavior of a vehicle occupant on the basis of images captured by the camera 12, an exterior image 38-5, and a sensing result representing running information of the vehicle detected by the ECU, classifies an evaluation event acquired as a result of the analysis as a desirable behavior or an undesirable behavior, and stores the evaluation event as the evaluation event information 38-3. The classification of the evaluation event, for example, is set by a public organization managing the evaluation server 100, a manufacturing company of the vehicle M, an insurance company, a credit company, or the like, and the evaluation event is analyzed on the basis of the classification in an analysis process performed by the analysis unit 34.

[Evaluation of Credibility]

Hereinafter, an evaluation of credibility of a vehicle occupant that is performed by the evaluation server 100 will be described. The evaluation server 100 derives an evaluation score for evaluating credibility of a vehicle occupant on the basis of an evaluation event of the vehicle occupant analyzed by the in-vehicle device 10.

The evaluation unit 120 may derive an evaluation score to be assigned on the basis of the accident history of the vehicle occupant. In such a case, for example, a rule (for example, a rule by which it is easy to gain evaluation points and it is difficult to lose evaluation points, such as a rule that a score of twice the normal points is assigned in the case of a positive score, and a score of 0.5 times the normal points is assigned in the case of a negative score) of adding predetermined bonus points at a collection timing or assigning evaluation points at a higher rate to a vehicle occupant having no history occurring within a predetermined period in the accident history information 136 is stored in the evaluation table 132.

The evaluation unit 120 may assign a high evaluation score in a case in which a vehicle occupant has graduated from a drivers' school with a high score, in a case in which a vehicle occupant has received lesson relating to driving manners, or in a case in which a vehicle occupant has received maintenance of the vehicle. In such a case, for example, a rule about predetermined bonus points or assigning evaluation points at a higher rate is stored in the evaluation table 132.

The evaluation unit 120, for example, determines whether or not a user A has caused an accident within a predetermined period by referring to the accident history information 136 recorded for each vehicle occupant as shown in FIG. 12, thereby determining an evaluation rule at the time of deriving the evaluation score.

The evaluation unit 120, for example, extracts the evaluation event information 138 shown in FIG. 9 or information of a predetermined period (for example, in units of months or in units of years) from the accident history information 136 shown in FIG. 12 and derives an evaluation score while referring to the evaluation table 132 shown in FIG. 11, thereby deriving a collection value of evaluation scores for each vehicle occupant shown in FIG. 10.

[Process Overview]

Figure 13:
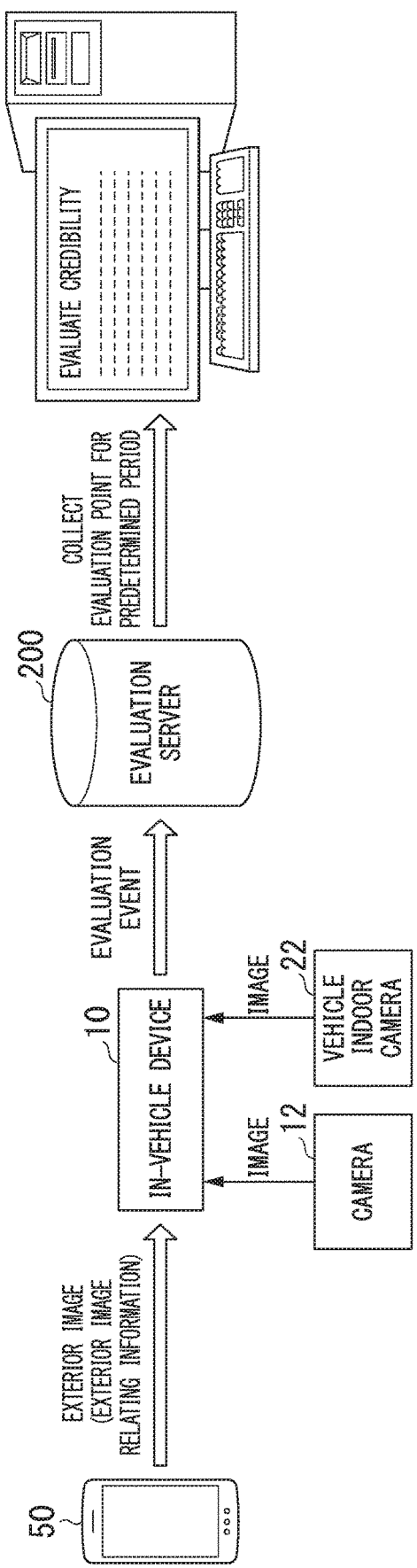
FIG. 13 is a diagram showing an overview of a process of an evaluation system.

FIG. 13 is a diagram showing an overview of a process of the evaluation system 1. First, the terminal device 50 transmits an image of an exterior of the vehicle M and the like to the in-vehicle device 10.

Next, the in-vehicle device 10 receives an image transmitted by the terminal device 50 and detects or estimates an evaluation event associated with a predetermined desirable behavior or a predetermined undesirable behavior of the vehicle occupant on the basis of the image. The in-vehicle device 10 may use images captured by the camera 12 and the vehicle indoor camera 22 at the time of detecting or estimating an evaluation event. The in-vehicle device 10 transmits the evaluation event information 38-3 that has been detected or estimated to the evaluation server 100.

The in-vehicle device 10 may detect or estimate a behavior of a vehicle occupant on the basis of images captured by the camera 12 and the vehicle indoor camera 22, an exterior image 64 transmitted by the image transmission application 62, and a comment of the vehicle occupant relating to the exterior image 64.

Next, the evaluation server 100 receives the evaluation event information 38-3 of the vehicle occupant transmitted by the in-vehicle device 10 and derives and assigns an evaluation score of the vehicle occupant on the basis of the information. The evaluation server 100, for example, collects evaluation scores of vehicle occupants for each vehicle occupant for every predetermined period.

[Process Flow]

Figure 14:
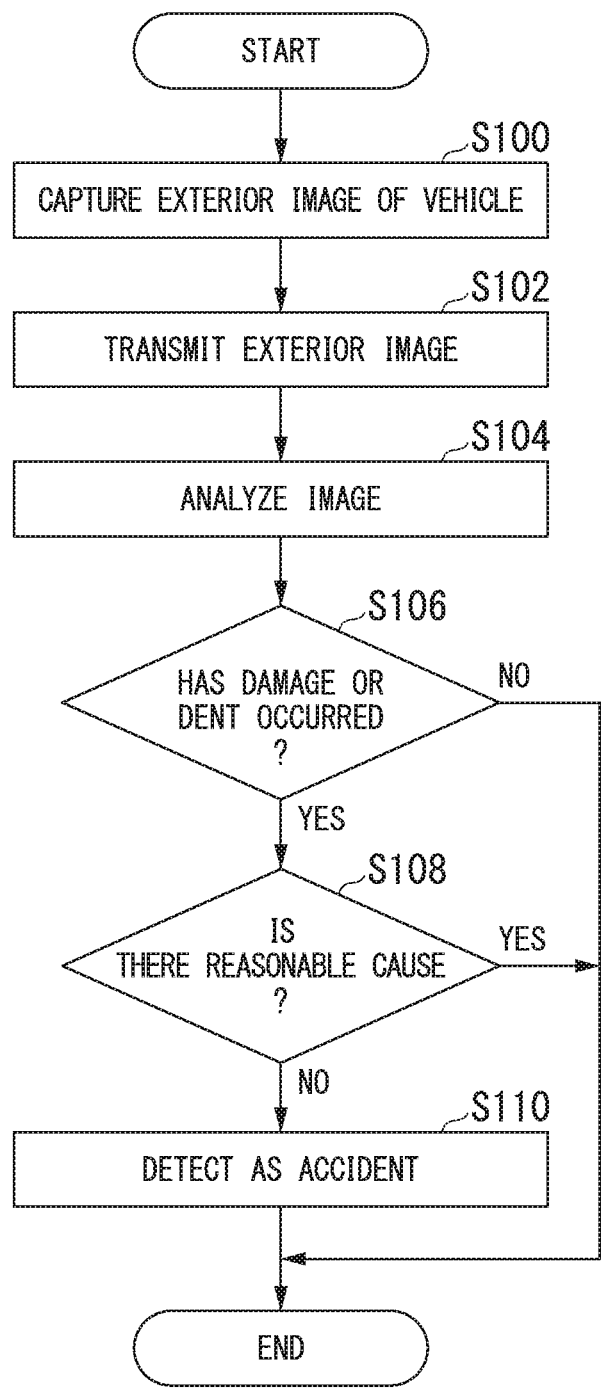
FIG. 14 is a flowchart showing one example of the flow of a determination process relating to an exterior of a vehicle using an in-vehicle device.

Hereinafter, the flow of a process performed by the evaluation system 1 will be described. FIG. 14 is a flowchart showing one example of the flow of a determination process relating to an exterior of a vehicle M using the in-vehicle device 10. The process of this flowchart, for example, may be repeatedly executed at a predetermined period.

First, camera 58 of the terminal device 50 captures an exterior image 64 of the vehicle M in accordance with an operation of the vehicle occupant (Step S100) and transmits the exterior image 64 to the in-vehicle device 10 through the image transmission application 62 (Step S102). In Step S102, in a case in which there is an input of the exterior image relating information 66 relating to the exterior image 64 from the vehicle occupant, the image transmission application 62 transmits the exterior image relating information together with the exterior image 64.

Next, the analysis unit 34 analyzes the exterior image transmitted by the terminal device 50 (Step S104) and determines whether or not there is a damage or a dent on the vehicle body of the vehicle M (Step S106). In a case in which it is determined that there is no damage and dent, the analysis unit 34 ends the process.

In a case in which it is determined that there is a damage or a dent in Step S106, the analysis unit 34 determines whether or not there is a reasonable cause for the occurrence of the damage or the dent on the basis of images captured by the camera 12 and report details (the exterior image 64 and the exterior image relating information 66) of the vehicle occupant transmitted by the terminal device 50 (Step S108).

In a case in which it is determined that there is a reasonable cause of the occurrence of the damage or the dent in Step S108, the analysis unit 34 ends the process. On the other hand, in a case in which it is determined that there is no reasonable cause of the occurrence of the damage or the dent in Step S108, the analysis unit 34 detects that the vehicle occupant has caused an accident (Step S110). As above, description of the process of this flowchart ends.

Figure 15:
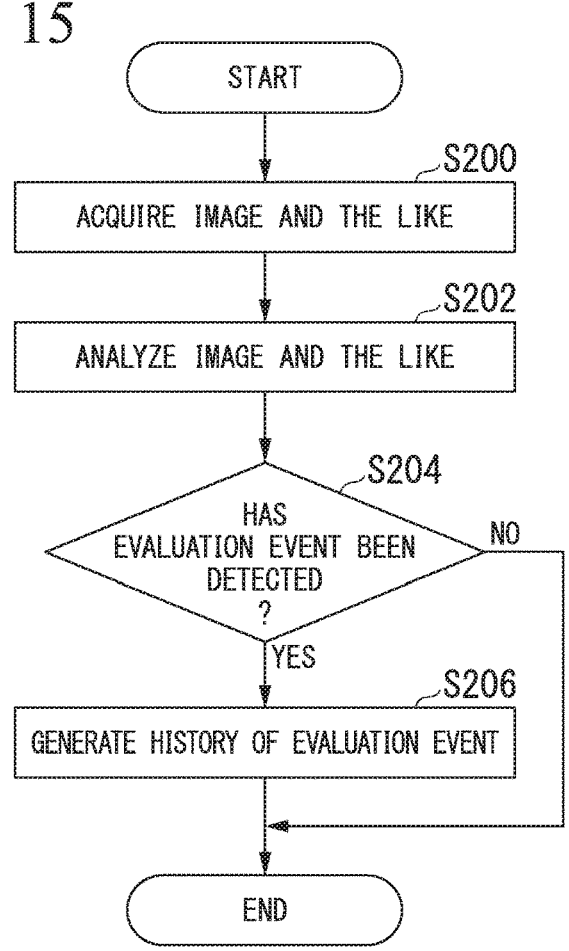
FIG. 15 is a flowchart showing one example of the flow of a determination process relating to a vehicle occupant's driving of a vehicle using an in-vehicle device.

FIG. 15 is a flowchart showing one example of the flow of a determination process relating to vehicle occupant's driving of a vehicle M using the in-vehicle device 10. The process of this flowchart, for example, may be repeatedly executed at a predetermined period.

First, the acquisition unit 32 acquires vehicle running information 38-2, an exterior image 38-5, a running-time image 38-6, and a vehicle indoor image 38-7 (Step S200). Next, the analysis unit 34 analyzes various kinds of information acquired by the acquisition unit 32 (Step S202).

Next, the analysis unit 34 determines whether or not an evaluation event of a vehicle occupant has been detected as a result of the analysis (Step S204). In a case in which it is determined that no evaluation event has been detected, the analysis unit 34 ends the process. On the other hand, in a case in which it is determined that an evaluation event has been detected, the analysis unit 34 stores a history of the evaluation event as evaluation event information 38-3 (Step S206). As above, the description of the process of this flowchart ends.

Figure 16:
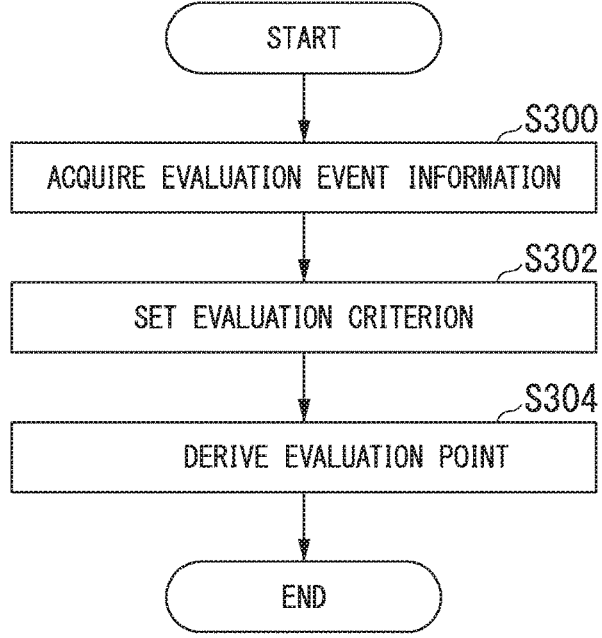
FIG. 16 is a flowchart showing one example of the flow of a process of deriving an evaluation score using an evaluation server.

FIG. 16 is a flowchart showing one example of the flow of a process of deriving an evaluation point using the evaluation server 100.

First, the analysis result acquiring unit 110 acquires evaluation event information 38-3 transmitted by the in-vehicle device 10 and stores the evaluation event information 38-3 in the storage unit 130 as evaluation event information 138 (Step S300). Next, the evaluation unit 120 sets an evaluation criterion on the basis of the evaluation table 132 (Step S302) and derives an evaluation point by referring to the evaluation table 132 (Step S304). As above, the description of the process of this flowchart ends.

Application Example of Analysis Result

The in-vehicle device 10, for example, may have a function of giving an advice such that the evaluation point can be easily raised by the vehicle occupant driving the vehicle M on the basis of a result of the analysis acquired by the analysis device 30.

For example, in a case in which there is history information representing that a vehicle occupant has caused an accident within a predetermined period in the accident history information 136, the in-vehicle device 10 instructs a navigation device (not shown in the drawing) of the vehicle M to avoid a way having a high accident occurrence rate, thereby giving an advice such that it becomes easy for the evaluation point of the vehicle occupant to be raised or giving an advice such that it becomes difficult for the evaluation point of the vehicle occupant to be lowered.

According to the first embodiment described above, by including the acquisition unit 32 that acquires an exterior image acquired by imaging the exterior of the vehicle M and the evaluation unit 120 that derives and assigns an evaluation score 134 for evaluating social credibility of the vehicle occupant of the vehicle M on the basis of the exterior image 38-5 acquired by the acquisition unit 32, the social credibility of the vehicle occupant can be evaluated.

Second Embodiment

Hereinafter, an evaluation system 1A according to a second embodiment will be described. In the following description, the same reference numerals as those of the first embodiment will be assigned to the same components and the same functions as those according to the first embodiment, and detailed description thereof will be omitted. "A" will be added to the end of each reference sign for a member having the same name as that of the first embodiment but has a configuration or a function different from that of the first embodiment.

In the second embodiment, a vehicle M will be described as being a taxi, a car sharing vehicle, or a ride sharing vehicle. The car sharing vehicle is a vehicle in a case in which one or more vehicles are shared by a plurality of users. The ride sharing vehicle is a vehicle that is used by a plurality of users getting-in together.

Figure 17:
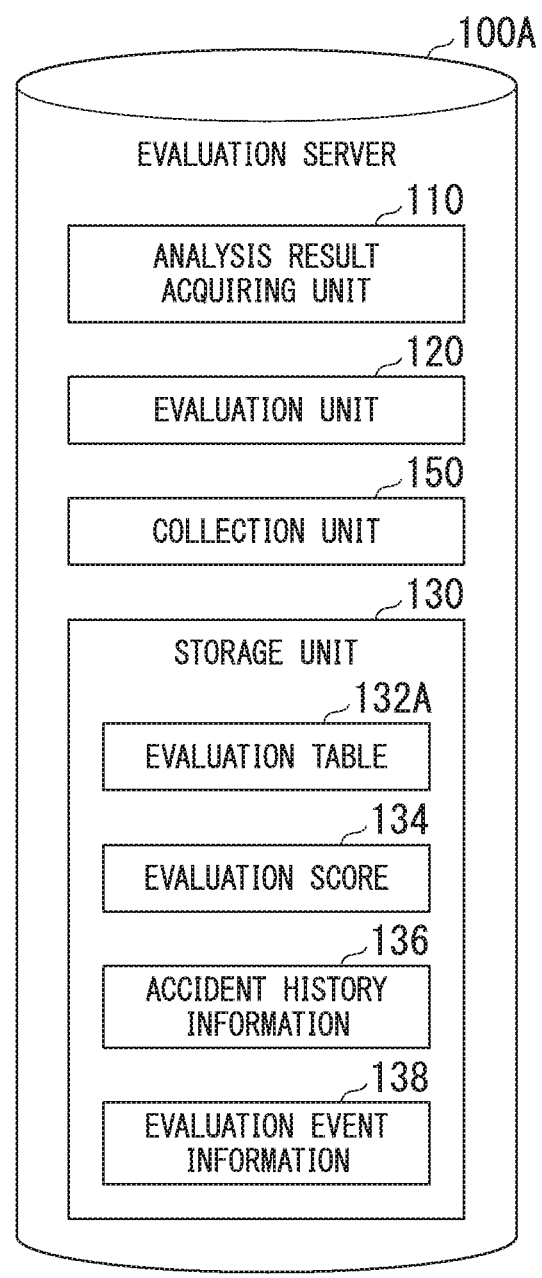
FIG. 17 is a diagram showing the configuration of an evaluation server according to a second embodiment.

FIG. 17 is a diagram showing the configuration of an evaluation server 100A according to the second embodiment. The evaluation server 100A further includes a collection unit 150 in addition to the evaluation server 100 according to the first embodiment.

The collection unit 150 collects evaluation points of a vehicle occupant for each organization to which the vehicle occupant belongs (for example, a work place of the vehicle occupant, a taxi company, a management organization of a car sharing vehicle or a ride sharing vehicle, or the like). The collection unit 150, for example, derives a total value or an average value of evaluation points in an organization unit to which vehicle occupants belong, ranking information of evaluation points within the organization, and the like by referring to information relating to the work place of a vehicle occupant or the organization to which a vehicle occupant belongs included in the vehicle occupant information 38-1.

In this case, an evaluation rule in which a bonus point is assigned to all the persons belonging to an organization in a case in which the evaluation point in an organization unit is higher than a predetermined criterion on the basis of a result collected by the collection unit 150 or the like may be stored in the evaluation table 132A.

In a case in which a vehicle occupant gets in a plurality of vehicles within a predetermined period, the collection unit 150 may set driving details of all the vehicles as a collection target or may allow a user of the evaluation server 100A to select each vehicle as a collection target or not. In a case in which a vehicle occupant had chances for getting in both a private vehicle and a ride sharing vehicle, the collection unit 150 may set only evaluation points at the time of getting in the ride sharing vehicle as collection targets or may set both evaluation points at the time of getting in the private vehicle and evaluation points at the time of getting in the ride sharing vehicle as collection targets.

[Evaluation of Behavior at the Time of Ride Sharing]

FIG. 18 is a diagram showing the evaluation table 132A referred to by the evaluation unit 120 in a case in which a vehicle M is a ride sharing vehicle. In the evaluation table 132A, for example, in addition to the behavior of the vehicle occupant at the time of driving from the same evaluation viewpoint as that of the evaluation table 132 according to the first embodiment, evaluation points for behaviors that are unique for the ride sharing are included.

In the evaluation table 132A, for example, as evaluation events that are unique for ride sharing, events contributing to keeping the vehicle M in order such as cleaning windows and picking up garbage are included. In the evaluation table 132A, cooperation with power energy charging of a ride sharing vehicle, reporting a failure of the vehicle to a manager of the ride sharing vehicle, and the like may be included.

Such an evaluation event, for example, may be detected by analyzing images captured by the vehicle indoor camera 22 or may be detected on the basis of an image or information provided by a vehicle occupant through the image transmission application 62A. In such a case, the image transmission application 62A stores an image of the vehicle cabin of the vehicle M captured by a vehicle occupant using the camera 58 in the storage unit 60 as a vehicle indoor image 68 (not shown in the drawing). The image transmission application 62A transmits the vehicle indoor image 68 to the in-vehicle device 10 in accordance with an operation of the vehicle occupant.

The acquisition unit 32 receives the vehicle indoor image 68 transmitted by the image transmission application 62A and stores the received vehicle indoor image 68 as a vehicle indoor image 38-7A (not shown in the drawing).

For example, by comparing the vehicle indoor image 38-7A before getting-in of a vehicle occupant and after cleaning with the vehicle indoor image 38-7A during getting-in of the vehicle occupant or at the time of getting off, the analysis unit 34A acquires a degree of keeping the vehicle M in order performed by the vehicle occupant. The degree of keeping in order, for example, is an index used for evaluating vehicle indoor furnishings of the vehicle M being at predetermined positions and an increase/decrease in the garbage and dirty. In a case in which objects that are strictly prohibited from being carried into the ride sharing vehicle M (for example, dangerous articles such as kerosene and powder and pets) are defined, the analysis unit 34A may analyze not carrying-in of such target objects to be included in the evaluation of the degree of keeping in order.

For example, in a case in which the degree of keeping in order at the time of getting off the vehicle is equal to or higher than a predetermined upper limit compared to that before vehicle occupant's getting in the vehicle, the analysis unit 34A detects that the vehicle occupant has performed an evaluation event for which the vehicle occupant is positively evaluated as the vehicle occupant contributing to keeping the vehicle cabin in order. On the other hand, for example, in a case in which the degree of keeping in order at the time of getting off the vehicle is lower than a predetermined upper limit compared to that before vehicle occupant's getting in the vehicle, the analysis unit 34A determines that the vehicle occupant has not contributed to keeping the vehicle cabin in order and detects that the vehicle occupant has performed an evaluation event for which the vehicle occupant is negatively evaluated.

In a case in which the vehicle M is a taxi or a ride sharing vehicle, evaluation of driver's driving may be performed by the other vehicle occupants, or vehicle occupants riding in the ride sharing vehicle together may assign and add mutual evaluations. In such a case, the image transmission application 62A has an additional function of an application program for evaluating driver's driving of the vehicle M among vehicle occupants or evaluating vehicle riding manner among vehicle occupants. The image transmission application 62A stores an evaluation of a driver, information indicating whether or not the other vehicle occupants respond with good manners, and evaluations of vehicle riding manners of the other vehicle occupants as vehicle occupant evaluation information 66A (not shown in the drawing).

FIG. 19 is a diagram showing evaluation event information 138A at the time of ride sharing. The analysis unit 34A, for example, detects cleaning windows, picking up garbage in a vehicle, and the like when a user A rides in a ride sharing vehicle and stores detected information in the storage unit 130 as evaluation event information 38-3 relating to ride sharing. The analysis result acquiring unit 110 receives the evaluation event information 38-3 set by the analysis unit 34A and stores the received information in the storage unit 130 as evaluation event information 138. The evaluation unit 120 assigns an evaluation point relating to ride sharing to a vehicle occupant on the basis of the evaluation event information 138A.

The evaluation unit 120A, for example, by referring to the evaluation event information 138A shown in FIG. 19, assigns an evaluation point of "+2" points to an evaluation event of the user A who is a vehicle occupant cleaning windows and assigns an evaluation point of "+2" points to an evaluation event of picking up garbage.

In evaluation events to which evaluation points are assigned, a behavior for evaluating a degree of contribution of a driver to the other vehicle occupants (for example, changing a destination or a transit point with priority over a plan of other ride sharing vehicle occupants, helping the other ride sharing vehicle occupants to get on/off the vehicle, receiving maintenance of the vehicle M, or a vehicle occupant's receiving a lesson relating to driving) and vehicle occupant's responding with good manners or not (for example, a ride sharing vehicle occupant making a noise inside the vehicle) may be included.

[Process Flow]

Figure 20:
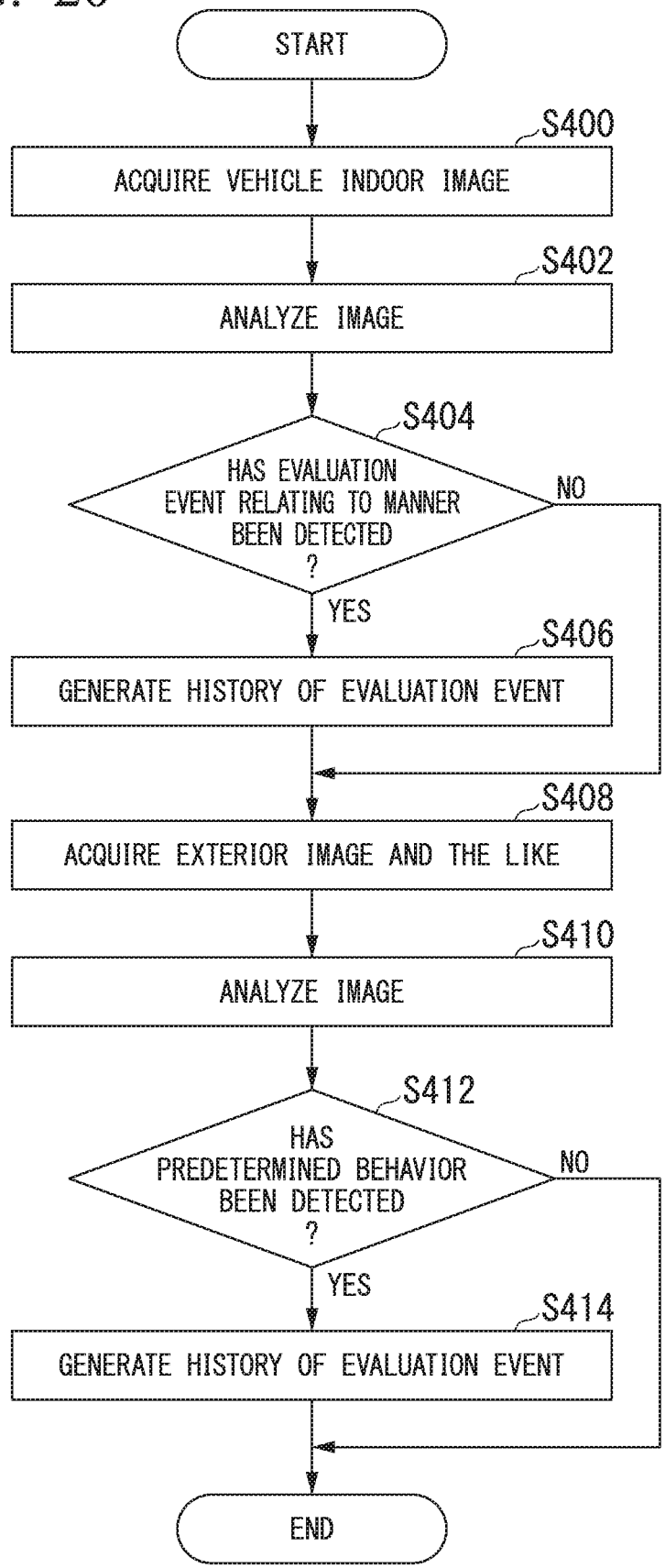
FIG. 20 is a flowchart showing one example of the flow of a determination process relating to a vehicle occupant's driving of a vehicle using an in-vehicle device according to the second embodiment.

FIG. 20 is a flowchart showing one example of the flow of a determination process relating to vehicle occupant's driving of a vehicle M using the in-vehicle device 10A according to the second embodiment.

First, the acquisition unit 32 acquires a vehicle indoor image 38-7A (Step S400). Next, the analysis unit 34A analyzes the acquired vehicle indoor image 38-7A (Step S402).

Next, the analysis unit 34A determines whether or not an evaluation event relating to a manner at the time of vehicle occupant's ride sharing has been detected as a result of the analysis (Step S404). In a case in which it is determined that no evaluation event has been detected, the analysis unit 34A causes the process to proceed to Step S408. On the other hand, in a case in which it is determined that an evaluation event has been detected, the analysis unit 34A stores a history of the evaluation event as evaluation event information 38-3A (Step S406).

Next, the acquisition unit 32 acquires an exterior image 38-5, a running-time image 38-6, and vehicle running information 38-2 (Step S408). Next, the analysis unit 34A analyzes the images and the information that have been acquired (Step S410).

Next, the analysis unit 34A determines whether or not an evaluation event relating to vehicle occupant's driving has been detected as a result of the analysis (Step S412). In a case in which it is determined that no evaluation event has been detected, the analysis unit 34A ends the process. On the other hand, in a case in which it is determined that an evaluation event has been detected, the analysis unit 34A stores a history of the evaluation event as evaluation event information 38-3 (Step S414). As above, description of the process of this flowchart ends.

Figure 21:
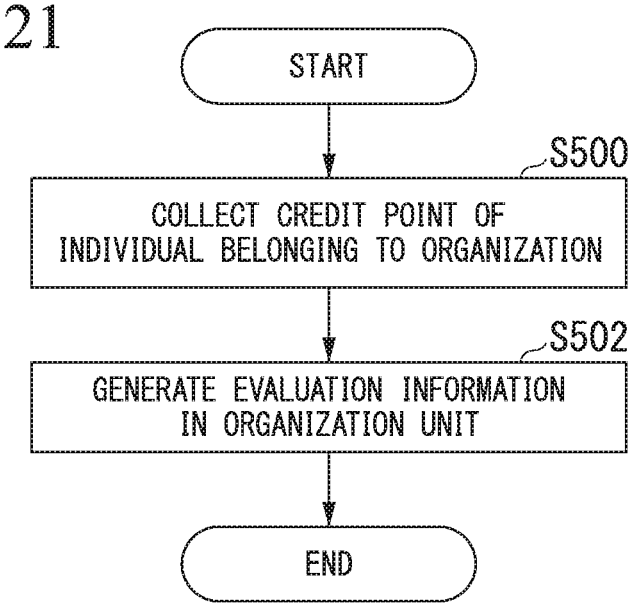
FIG. 21 is a flowchart showing one example of the flow of a collection process performed by a collection unit.

FIG. 21 is a flowchart showing one example of the flow of a collection process performed by the collection unit 150.

First, the collection unit 150 collects evaluation points of vehicle occupants for each unit of collection set by a user using the evaluation server 100A by referring to the vehicle occupant information 38-1 (Step S500). Next, the collection unit 150 generates evaluation information in an organization unit in outputting the result of the collection of Step S500 in a predetermined report form (Step S502). As above, the description of the process of this flowchart ends.

Application Example of Analysis Result

The in-vehicle device 10A, for example, gives an advice such that, by a vehicle occupant driving the vehicle M on the basis of a result of analysis acquired by the analysis device 30A, it becomes easy for the evaluation point to be raised.

For example, in a case in which there is a vehicle indoor cleaning facility near a movement path of the vehicle M, the in-vehicle device 10A causes the navigation device (not shown in the drawing) to propose a vehicle occupant to raise a credit point by pulling over the vehicle indoor cleaning facility, thereby giving an advice such that it becomes easy for the evaluation point of the vehicle occupant to be raised.

As described above, according to the evaluation system 1A of the second embodiment, in addition to acquisition of effects similar to those according to the first embodiment, the acquisition unit 32 acquires a vehicle indoor image 38-7 acquired by imaging the vehicle cabin using the vehicle indoor camera 22, and the analysis unit 34A detects an evaluation event on the basis of a degree of contribution of a vehicle occupant to keeping of the vehicle M in order or a degree of contribution to other vehicle occupants on the basis of the vehicle indoor image 38-7A, whereby sociability or manners of a vehicle occupant in a case in which the vehicle M is a ride sharing vehicle can be evaluated. According to the evaluation system 1A of the second embodiment, information relating to evaluation points in an organization unit to which vehicle occupants belong is acquired by the collection unit 150, and accordingly, an evaluation of sociability of each organization can be acquired in addition to sociability of individual vehicle occupants.

The first embodiment and the second embodiment described above do not have an exclusive relation but may be appropriately combined. For example, the evaluation server 100 may derive an evaluation point of an organization to which vehicle occupants belong together with deriving evaluation points of individual vehicle occupants.

The embodiments described above can be represented as below.

An evaluation system that includes a storage device and a hardware processor, and the hardware processor described above, by executing a program stored in the storage device, is configured to acquire an image acquired by imaging an exterior of a vehicle and derive and assign an evaluation point for evaluating social credibility of a vehicle occupant of the vehicle on the basis of the acquired image described above.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An evaluation system comprising:
at least one memory storing instructions, and
at least one processor configured to execute the instructions to:
acquire a first exterior image and a second exterior image, wherein the first exterior image is acquired by imaging an exterior of a vehicle in an area outside of the vehicle using a terminal device, the vehicle is a vehicle occupant's own vehicle in which the vehicle occupant has ridden, the terminal device is configured to be held by the vehicle occupant, the second exterior image is acquired by imaging the area outside of the vehicle using an in-vehicle camera, the in-vehicle camera is mounted in the vehicle, and the second exterior image depicts at least a part of the exterior of the vehicle;
detect or estimate an evaluation event that is a predetermined behavior of the vehicle occupant using the first and second exterior images acquired, and
based on the evaluation event detected or estimated, derive and assign an evaluation score for evaluating social credibility of the vehicle occupant of the vehicle.

2. The evaluation system according to claim 1, wherein the at least one processor is further configured to:
in a case in which a predetermined desirable behavior of the vehicle occupant is detected based on the evaluation event detected or estimated, evaluate the vehicle occupant positively, and
in a case in which a predetermined undesirable behavior of the vehicle occupant is detected based on the evaluation event detected or estimated, evaluate the vehicle occupant negatively.

3. The evaluation system according to claim 2, wherein the at least one processor is further configured to classify the evaluation event detected or estimated in patterns on the basis of the first and second exterior images.

4. The evaluation system according to claim 1, wherein the at least one processor is further configured to when the determination result comprises that the change of the exterior of the vehicle has occurred and it is determined that a cause of the change of the exterior of the vehicle is the vehicle occupant, evaluate the vehicle occupant negatively.

5. The evaluation system according to claim 1, wherein the at least one processor is further configured to:
acquire information representing that the vehicle occupant has yielded to another vehicle during driving of the vehicle based on the image acquired by imaging the area outside of the vehicle using the in-vehicle camera, and
based on the information, determine that the vehicle occupant has performed a desirable behavior and evaluate the vehicle occupant positively.

6. The evaluation system according to claim 1, wherein the at least one processor is further configured to:
acquire an image acquired by imaging a vehicle cabin using a vehicle indoor camera mounted in the vehicle,
evaluate a degree of contribution of the vehicle occupant to keeping the vehicle in order based on the image acquired by imaging the vehicle cabin,
in a case in which the degree is equal to or higher than a predetermined upper limit, determine that the vehicle occupant has performed a desirable behavior and evaluate the vehicle occupant positively, and
in a case in which the degree acquired is lower than a predetermined lower limit, determine that the vehicle occupant has performed an undesirable behavior and evaluate the vehicle occupant negatively.

7. The evaluation system according to claim 6, wherein the at least one processor is further configured to:
based on the image acquired by imaging the vehicle cabin, acquire a degree of contribution of a vehicle occupant responsible for driving to other vehicle occupants, and
in a case in which the degree acquired is equal to or higher than a predetermined degree, determine that the vehicle occupant responsible for driving has performed the desirable behavior and evaluate the vehicle occupant responsible for driving positively.

8. The evaluation system according to claim 6, wherein the at least one processor is further configured to:
acquire information used for determining whether or not a vehicle occupant responds to other vehicle occupants with good manners on the basis of the image acquired by imaging the vehicle cabin,
determine whether or not the vehicle occupant has performed the desirable behavior on the basis of the information acquired and used for determining whether or not the vehicle occupant responds with good manners, and
in a case in which it is determined that the vehicle occupant has performed the desirable behavior, evaluate the vehicle occupant positively.

9. The evaluation system according to claim 1, wherein the at least one processor is further configured to collect the evaluation scores of the vehicle occupant for each organization unit to which the vehicle occupant belongs.

10. The evaluation system according to claim 1, wherein the at least one processor is further configured to:
determine whether or not there is a change in the exterior of the vehicle using the first and second exterior images acquired,
when it is determined there is the change in the exterior of the vehicle, determine whether or not there is a reasonable cause for occurrence of the change in the exterior of the vehicle using the second exterior image,
when it is determined that there is no reasonable cause for the occurrence of the change in the exterior of the vehicle, detect that the vehicle occupant has caused the change in the exterior of the vehicle resulting in a detection result, and
based on the detection result, determine that the evaluation event has been detected or estimated, the evaluation event that the vehicle occupant has caused the change in the exterior of the vehicle.

11. The evaluation system according to claim 1, wherein the at least one processor is further configured to:
acquire report details of the vehicle occupant received via the terminal device by the vehicle occupant,
determine whether or not there is a change in the exterior of the vehicle using the first and second exterior images acquired,
when it is determined there is the change in the exterior of the vehicle, determine whether or not there is a reasonable cause for occurrence of the change in the exterior of the vehicle using the second exterior image and the report details of the vehicle occupant,
when it is determined that there is no reasonable cause for the occurrence of the change in the exterior of the vehicle, detect that the vehicle occupant has caused the change in the exterior of the vehicle resulting in a detection result, and
based on the detection result, determine that the evaluation event has been detected or estimated, the evaluation event that the vehicle occupant has caused the change in the exterior of the vehicle.

12. The evaluation system according to claim 1, wherein the at least one processor is further configured to:
based on the first exterior image, the second exterior image, and the report detail of the vehicle occupant acquired, search the second exterior image in a time frame at which the change of the exterior of the vehicle is assumed to have occurred,
based on the second exterior image searched, determine whether or not there is contradiction between the second exterior image searched and the report detail of the vehicle occupant resulting in a determination result, and
based on the determination result, determine whether or not the vehicle occupant has caused the change in the exterior of the vehicle.

13. An evaluation method using a computer, the evaluation method comprising:
acquiring a first exterior image and a second exterior image, the first exterior image being acquired by imaging an exterior of a vehicle in an area outside of the vehicle using a terminal device, the vehicle being a vehicle occupant's own vehicle in which the vehicle occupant has ridden, the terminal device being configured to be hold by the vehicle occupant, the second exterior image being acquired by imaging the area outside of the vehicle using an in-vehicle camera, the vehicle camera being mounted in the vehicle, and the second exterior image depicting at least a part of the exterior of the vehicle;
detecting or estimating an evaluation event that is a predetermined behavior of the vehicle occupant using the first and second exterior images acquired; and
based on the evaluation event detected or estimated, deriving and assigning an evaluation score for evaluating social credibility of the vehicle occupant of the vehicle.

14. A non-transitory computer-readable storage medium causing a computer to:
acquire a first exterior image and a second exterior image, wherein the first exterior image is acquired by imaging an exterior of a vehicle in an area outside of the vehicle using a terminal device, the vehicle is a vehicle occupant's own vehicle in which the vehicle occupant has ridden, the terminal device is configured to be held by the vehicle occupant, the second exterior image is acquired by imaging the area outside of the vehicle using an in-vehicle camera, the in-vehicle camera is mounted in the vehicle, and the second exterior image depicts at least a part of the exterior of the vehicle;
detect or estimate an evaluation event that is a predetermined behavior of the vehicle occupant using the first and second exterior images acquired; and
based on the evaluation event detected or estimated, derive and assign an evaluation score for evaluating social credibility of a vehicle occupant of the vehicle.

* * * * *